US008563902B2

(12) United States Patent
Aoki et al.

(10) Patent No.: US 8,563,902 B2
(45) Date of Patent: Oct. 22, 2013

(54) HEATER CONTROL DEVICE AND METHOD FOR EXHAUST GAS SENSOR

(75) Inventors: Keiichiro Aoki, Numazu (JP); Yoshihiro Ide, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1115 days.

(21) Appl. No.: 12/513,948

(22) PCT Filed: Jun. 25, 2008

(86) PCT No.: PCT/IB2008/001655

§ 371 (c)(1),
(2), (4) Date: May 7, 2009

(87) PCT Pub. No.: WO2009/001201

PCT Pub. Date: Dec. 31, 2008

(65) Prior Publication Data

US 2010/0000984 A1 Jan. 7, 2010

(30) Foreign Application Priority Data

Jun. 27, 2007 (JP) ................................ 2007-169284

(51) Int. Cl.
*H05B 1/02* (2006.01)
*G01M 15/10* (2006.01)

(52) U.S. Cl.
USPC ........... 219/494; 123/697; 123/703; 123/381; 123/382; 123/390; 123/575

(58) Field of Classification Search
USPC .......... 219/494, 497, 505, 499; 123/697, 703, 123/381, 382, 390, 575; 701/29.7, 29.9, 701/30.3, 30.5, 30.8; 73/23.31, 23.32; 60/276
See application file for complete search history.

(56) References Cited

U.S. PATENT DOCUMENTS

| | | | | |
|---|---|---|---|---|
| 4,121,988 | A * | 10/1978 | Sano et al. | 204/429 |
| 4,369,736 | A * | 1/1983 | Ito | 123/1 A |
| 4,391,253 | A * | 7/1983 | Ito | 123/406.44 |
| 4,481,908 | A * | 11/1984 | Iida | 123/406.44 |
| 4,957,087 | A * | 9/1990 | Ota | 123/479 |
| 4,989,570 | A * | 2/1991 | Kuribara et al. | 123/494 |
| 4,993,386 | A * | 2/1991 | Ozasa et al. | 123/25 J |
| 4,993,391 | A * | 2/1991 | Kuribara et al. | 123/482 |
| 5,014,670 | A * | 5/1991 | Mitsumoto | 123/406.15 |
| 5,018,483 | A * | 5/1991 | Kashima et al. | 123/1 A |
| 5,033,293 | A * | 7/1991 | Honma et al. | 73/114.38 |

(Continued)

FOREIGN PATENT DOCUMENTS

| | | |
|---|---|---|
| JP | 1 61653 | 4/1989 |
| JP | 10-26599 | 1/1998 |

(Continued)

*Primary Examiner* — Joseph M Pelham
*Assistant Examiner* — Jimmy Chou
(74) *Attorney, Agent, or Firm* — Oblon, Spivak, McClelland, Maier & Neustadt, L.L.P.

(57) ABSTRACT

An oxygen concentration sensor is disposed in an engine exhaust passageway. The alcohol concentration in the fuel used in the internal combustion engine is detected. A target impedance is set on the basis of the detected alcohol concentration. The actual impedance of a sensor element of the oxygen concentration sensor is detected. The heater output of the exhaust gas sensor is controlled so that the actual impedance becomes equal to the target impedance, whereby the temperature of the sensor element represented by the impedance becomes equal to a target temperature represented by the target impedance.

12 Claims, 4 Drawing Sheets

(56) References Cited

U.S. PATENT DOCUMENTS

| | | | | | |
|---|---|---|---|---|---|
| 5,060,619 | A * | 10/1991 | Sakurai et al. | 123/494 |
| 5,150,301 | A * | 9/1992 | Kashiwabara et al. | 701/106 |
| 5,179,926 | A * | 1/1993 | Ament | 123/494 |
| 5,249,130 | A * | 9/1993 | Mamiya et al. | 701/109 |
| 5,852,228 | A * | 12/1998 | Yamashita et al. | 73/23.32 |
| 6,578,563 | B2 * | 6/2003 | Hada et al. | 123/697 |
| 6,696,673 | B2 * | 2/2004 | Okamoto | 219/494 |
| 6,714,856 | B2 * | 3/2004 | Huff et al. | 701/114 |
| 7,209,826 | B2 * | 4/2007 | Abe et al. | 701/109 |
| 7,487,762 | B2 * | 2/2009 | Kaneko | 123/508 |
| 7,523,739 | B2 * | 4/2009 | Kaneko | 123/381 |
| 7,526,914 | B2 * | 5/2009 | Nakano | 60/276 |
| 7,549,408 | B2 * | 6/2009 | Russell | 123/481 |
| 7,568,477 | B2 * | 8/2009 | Aoki | 123/676 |
| 7,654,077 | B2 * | 2/2010 | Zillmer et al. | 60/277 |
| 7,655,121 | B2 * | 2/2010 | Inagaki et al. | 204/406 |
| 7,673,621 | B2 * | 3/2010 | Carr et al. | 123/575 |
| 7,685,995 | B2 * | 3/2010 | Nonoyama | 123/406.31 |
| 7,730,718 | B2 * | 6/2010 | Higuchi | 60/285 |
| 7,805,928 | B2 * | 10/2010 | Shouda et al. | 60/285 |
| 7,820,949 | B2 * | 10/2010 | Sasaki et al. | 219/497 |
| 7,850,833 | B2 * | 12/2010 | Aoki | 204/428 |
| 7,909,019 | B2 * | 3/2011 | Stein | 123/406.23 |
| 7,933,713 | B2 * | 4/2011 | Leone | 701/123 |
| 7,949,458 | B2 * | 5/2011 | Yasui et al. | 701/102 |
| 8,113,180 | B2 * | 2/2012 | Jankovic et al. | 123/518 |
| 8,209,981 | B2 * | 7/2012 | Pursifull et al. | 60/607 |
| 8,234,035 | B2 * | 7/2012 | Iwagami et al. | 701/30.5 |
| 8,401,766 | B2 * | 3/2013 | Iwazaki et al. | 701/109 |
| 2004/0039514 | A1 * | 2/2004 | Steichen et al. | 701/109 |
| 2004/0173196 | A1 * | 9/2004 | Hosoya et al. | 123/697 |
| 2006/0047468 | A1 * | 3/2006 | Aoki | 702/132 |
| 2006/0117737 | A1 * | 6/2006 | Ohsaki | 60/276 |
| 2007/0010932 | A1 * | 1/2007 | Gotoh et al. | 701/114 |
| 2008/0035106 | A1 * | 2/2008 | Stein | 123/304 |
| 2008/0312810 | A1 * | 12/2008 | Nonoyama | 701/111 |

FOREIGN PATENT DOCUMENTS

| | | |
|---|---|---|
| JP | 2000-180405 | 6/2000 |
| JP | 2002 318219 | 10/2002 |
| JP | 2003 138967 | 5/2003 |
| JP | 2005 2974 | 1/2005 |

* cited by examiner

HEATER CONTROL DEVICE AND METHOD FOR EXHAUST GAS SENSOR

FIELD OF THE INVENTION

The invention relates to a heater control device and a heater control method for an exhaust gas sensor.

BACKGROUND OF THE INVENTION

There is a known internal combustion engine in which an exhaust gas sensor that produces an output according to the amount or concentration of a specific component in exhaust gas, for example, an oxygen concentration sensor that produces an output according to the oxygen concentration in exhaust gas, is disposed in an engine exhaust passageway, and the air-fuel ratio is controlled on the basis of the output voltage of the oxygen concentration sensor. However, the output of the foregoing exhaust gas sensor changes according to the temperature of the sensor element.

To overcome this, the oxygen concentration sensor is provided with an electric heater, which is used to heat the sensor element so that the temperature of the sensor element is kept at a predetermined target temperature, in a known internal combustion engine (see Japanese Patent Application Publication No. 2005-2974 (JP-A-2005-2974)). In this technology, the temperature of the sensor element is represented by the impedance of the sensor element. Therefore, a target impedance that represents the target temperature is set beforehand, and the actual impedance of the sensor element is detected, and the output of the electric heater is controlled so that the actual impedance becomes equal to the target impedance.

However, the impedance of the sensor element changes according to the property of the fuel used in the engine. Specifically, in the case where the fuel used in the engine is, for example, an alcohol-containing gasoline, the impedance of the sensor element changes according to the alcohol concentration in the fuel. This is because the components of exhaust gas vary according to the alcohol concentration in the fuel, and, for example, the electric resistance of an electrolyte portion formed from zirconia changes according to the components contained in the exhaust gas. Therefore, even though the actual impedance is maintained at the target impedance, there is a possibility that the actual temperature of the sensor element may not be maintained at the target temperature depending on the property of the fuel used in the engine. This means that the output of the exhaust gas sensor is not necessarily accurate.

DISCLOSURE OF THE INVENTION

A first aspect of the invention relates to a heater control device for a heater-equipped exhaust gas sensor disposed in an exhaust passageway of an internal combustion engine. This heater control device includes: detection means for detecting a property of a fuel used in the internal combustion engine; setting means for setting a target impedance based on the detected property of the fuel; and control means for controlling a heater output of the exhaust gas sensor so that an impedance of a sensor element of the exhaust gas sensor becomes equal to the set target impedance. This heater control device is controlled so that a temperature of the sensor element represented by the impedance becomes equal to the target temperature that is represented by the target impedance.

A second aspect of the invention relates to a heater control method for a heater-equipped exhaust gas sensor disposed in an exhaust passageway of an internal combustion engine. This control method includes the step of detecting a property of a fuel used in the internal combustion engine, the step of setting a target impedance of a sensor element of the exhaust gas sensor based on the detected fuel property, and the step of controlling a heater output of the exhaust gas sensor so that an impedance of the sensor element of the exhaust gas sensor becomes equal to the set target impedance.

Irrespective of the property of the fuel used in the engine, the temperature of the sensor element can be maintained at the target temperature, and therefore the accuracy of the output of the exhaust gas sensor can be maintained.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF EMBODIMENTS

Figure 1:
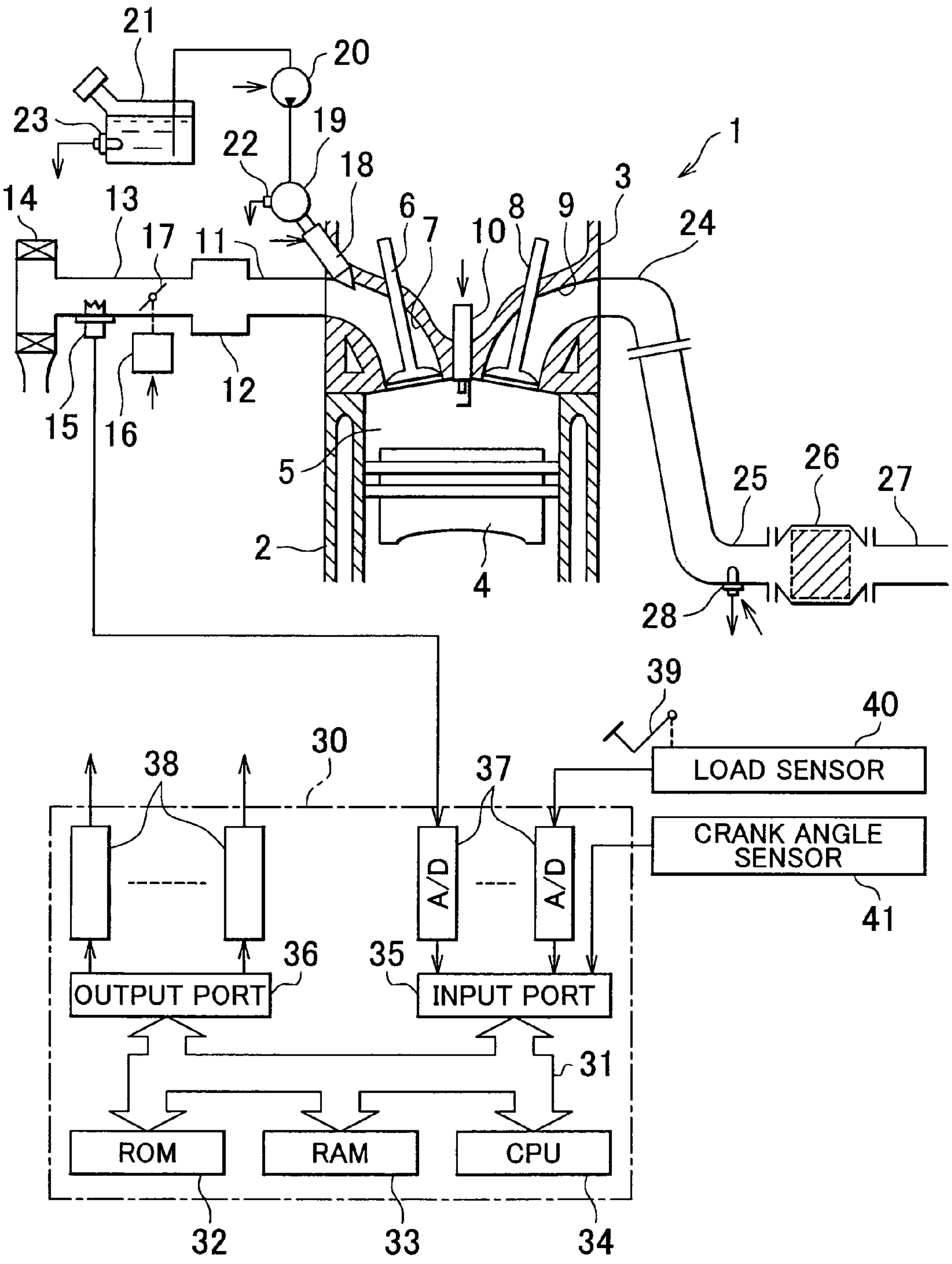
FIG. 1 is an overall view of an internal combustion engine.

FIG. 1 shows an engine body 1, a cylinder block 2, a cylinder head 3, a piston 4, a combustion chamber 5, an intake valve 6, an intake port 7, an exhaust valve 8, an exhaust port 9, and an ignition plug 10. The intake port 7 of each cylinder is linked to a surge tank 12 via a corresponding one of intake branch pipes 11. The surge tank 12 is linked to an air cleaner 14 via an intake duct 13. An air flow meter 15, and a throttle valve 17 driven by a step motor 16 are disposed within the intake duct 13. Besides, a fuel injection valve 18 is attached to each intake port 7. The fuel injection valves 18 are linked to a common rail 19. The common rail 19 is linked to a fuel tank 21 via a fuel pump 20 that allows control of the amount of ejection therefrom. A fuel pressure sensor 22 is attached to the common rail 19. The amount of ejection from the fuel pump 20 is controlled so that the fuel pressure in the common rail 19 detected by the fuel pressure sensor 22 becomes equal to a target pressure. Besides, a fuel property sensor 23 for detecting a property of fuel within the fuel tank 20 is attached to the fuel tank 20.

In an embodiment of the invention, an alcohol-containing gasoline obtained by blending gasoline with alcohol is used. In this case, the alcohol concentration in the fuel can vary, for example, from zero to 100 percent. Therefore, in this embodiment, a fuel property sensor 23 is constructed by an alcohol concentration sensor that produces an output in accordance with the alcohol concentration in the fuel.

On the other hand, the exhaust ports 9 of the cylinders are linked to a catalyst 26 via the corresponding branch pipes of an exhaust manifold 24 and also via an exhaust pipe 25. The catalyst 26 is linked to an exhaust pipe 27. An exhaust gas sensor 28 is attached in the exhaust pipe 25.

Figure 2:
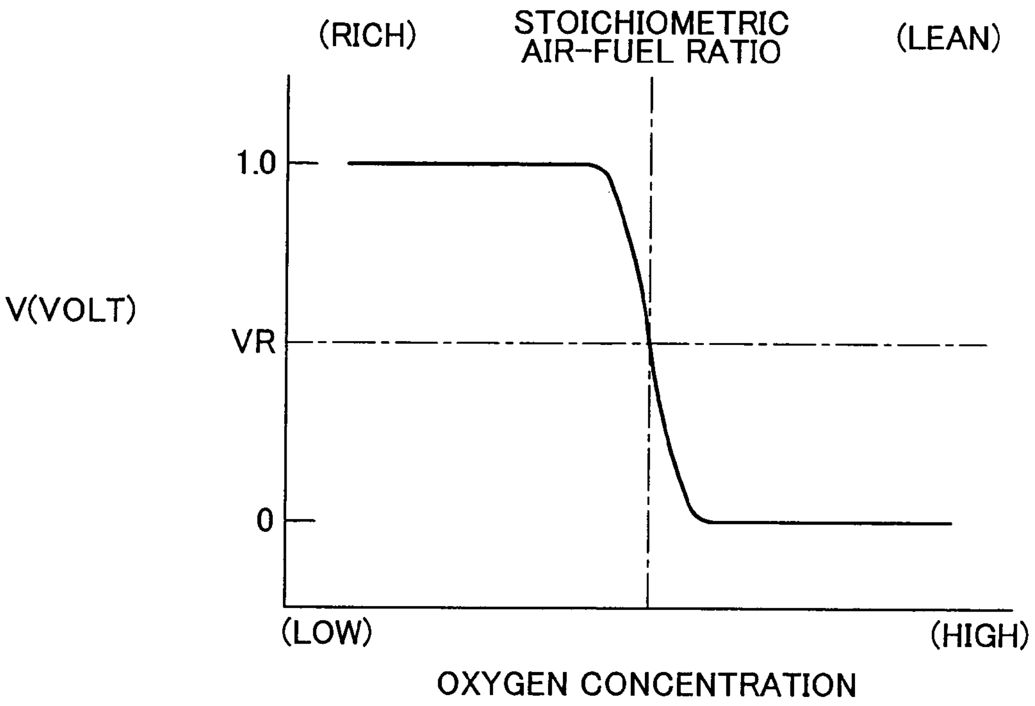
FIG. 2 is a graph showing the output voltage of an oxygen concentration sensor.

The exhaust gas sensor 28 produces an output according to the amount or concentration of a specific component of exhaust gas. In the embodiment of the invention, the exhaust gas sensor 28 is constructed of an oxygen concentration sensor that produces an output voltage according to the oxygen concentration in exhaust gas. The output voltage V of the oxygen concentration sensor 28 becomes substantially zero (volt) when the oxygen concentration in exhaust gas is low, and reaches substantially 1.0 (volt) when the oxygen concentration is high, as shown in FIG. 2. Incidentally, in FIG. 2, the output voltage V produced when the air-fuel ratio is a stoichiometric air-fuel ratio is shown as VR. It can be understood herein that the oxygen concentration in exhaust gas represents the air-fuel ratio, and that when the output voltage V is substantially zero (volt), the air-fuel ratio is rich, and that when the output voltage V is 1.0 (volt), the air-fuel ratio is lean. Besides, the output voltage V sharply changes as the air-fuel ratio changes across the stoichiometric air-fuel ratio.

Figure 3:
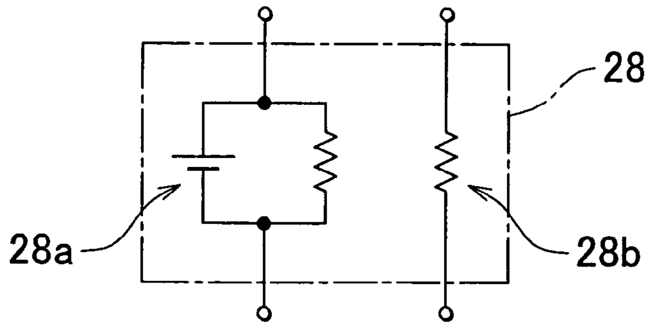
FIG. 3 is a diagram conceptually showing the construction of the oxygen concentration sensor.

FIG. 3 conceptually shows the construction of the oxygen concentration sensor 28. As shown in FIG. 3, the oxygen concentration sensor 28 includes a sensor element 28*a* and an electric heater 28*b*. The sensor element 28*a* produces the aforementioned output voltage V. On the other hand, the electric heater 28*b* is provided for adjusting the temperature of the sensor element 28*a*. When the output of the electric heater 28*b* is increased, the temperature of the sensor element 28*a* rises. When the output of the electric heater 28*b* is decreased, the temperature of the sensor element 28*a* declines.

Referring back to FIG. 1, an electronic control unit 30 is made up of a digital computer that includes a ROM (read-on memory) 32, a RAM (random access memory) 33, a CPU (central processing unit, or a microprocessor) 34, an input port 35 and an output port 36. They are connected with each other via a bi-directional bus 31. An accelerator pedal 39 is connected to a load sensor 40 that produces an output voltage that is proportional to the amount of depression of the accelerator pedal 39. The output voltages of the air flow meter 15, the fuel pressure sensor 22, the alcohol concentration sensor 23, the sensor element 28*a* of the oxygen concentration sensor 28, and the load sensor 40 are input to the input port 36 via corresponding AD converters 38. Furthermore, a crank angle sensor 41 produces an output pulse at every rotation of, for example, 30°, of the crankshaft, and the output pulse is input to the input port 35. The CPU 34 calculates the engine rotation speed Ne on the basis of the output pulse from the crank angle sensor 41. On the other hand, the output port 36 is connected to the ignition plug 10, the step motor 16, the fuel injection valve 17 and the fuel pump 20 via corresponding drive circuits 38.

If the temperature of the sensor element 28*a* of the oxygen concentration sensor 28 is lower than its activation temperature, there is possibility that the output voltage of the oxygen concentration sensor 28 may become unstable, that is, the output voltage of the oxygen concentration sensor 28 may fail to accurately represent the oxygen concentration in exhaust gas. Therefore, in accordance with the embodiment of the invention, the temperature of the sensor element 28*a* is controlled so as to be maintained at a target temperature that is higher than or equal to the activation temperature.

In this case, the temperature of the sensor element 28*a* can be represented by the impedance of the sensor element 28*a*. In the embodiment of the invention, a target impedance that represents the target temperature is set, and the actual impedance that represents the actual temperature of the sensor element 28*a* is detected, and the output of the electric heater 28*b* is, for example, feedback-controlled, so that the actual impedance becomes equal to the target impedance.

Figure 4:
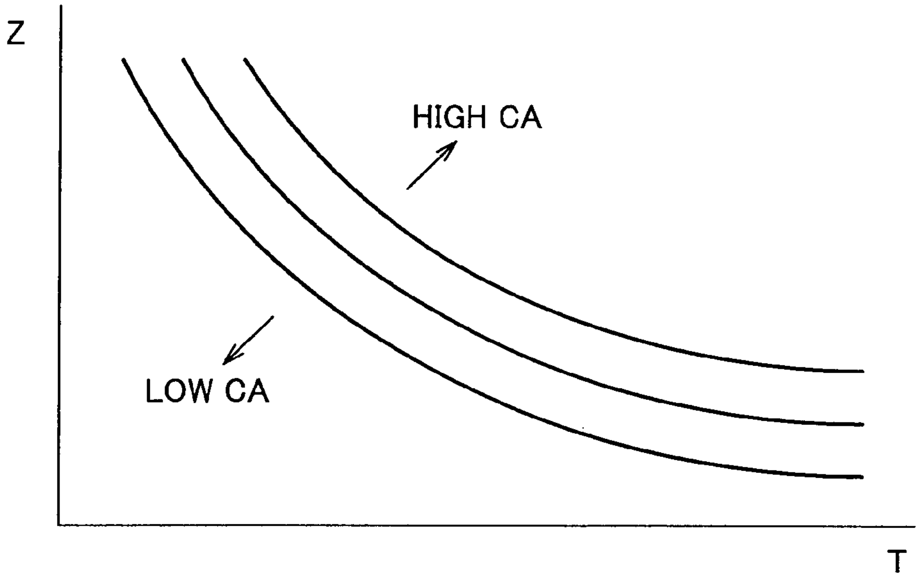
FIG. 4 is a graph showing the impedance Z of a sensor element.

However, the impedance of the sensor element 28*a* changes according to the alcohol concentration in fuel. Specifically, as shown in FIG. 4, although the temperature T of the sensor element 28*a* is fixed, higher alcohol concentrations CA in fuel cause greater impedances Z of the sensor element 28*a*, and lower alcohol concentrations CA cause lower impedances Z.

Figure 5:
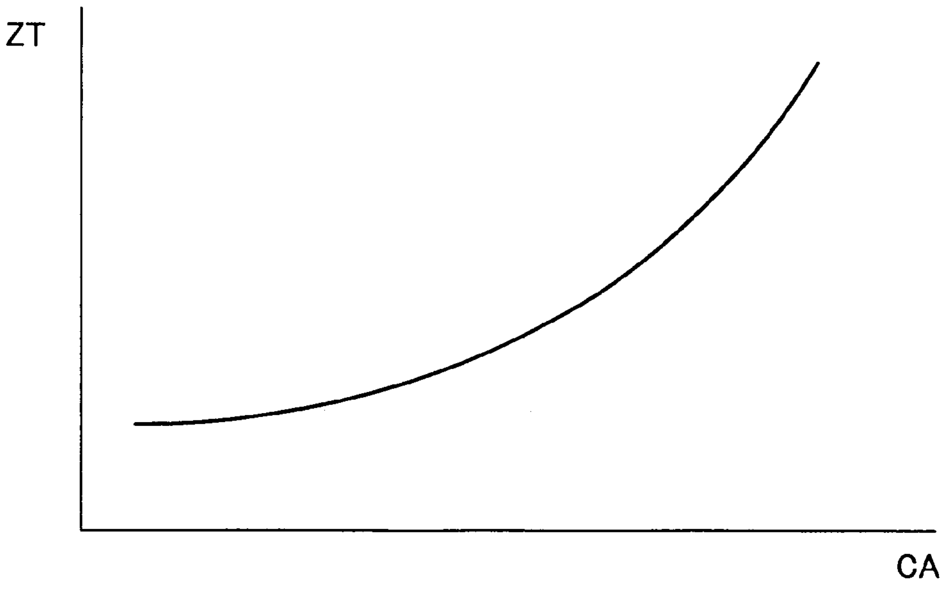
FIG. 5 is a diagram showing a map of the target impedance ZT.

In the embodiment according to the invention, the target impedance Z is changed according to the alcohol concentration CA in fuel. Concretely, as shown in FIG. 5, the target impedance ZT is set so as to become larger as the alcohol concentration CA heightens. In consequence, irrespective of the alcohol concentration CA, the actual temperature of the sensor element 28*a* can be maintained at the target temperature, and therefore the accuracy of the output of the oxygen concentration sensor 28 can be maintained. The target impedance ZT is pre-stored in the ROM 32, in the form of a map shown in FIG. 5.

From the foregoing description, it can be generalized that the property of the fuel used in the internal combustion engine is detected, and a target impedance is set on the basis of the detected fuel property, and the heater output of the exhaust gas sensor is controlled so that the impedance of the sensor element of the exhaust gas sensor becomes equal to the target impedance, and therefore the temperature of the sensor element represented by the impedance becomes equal to the target temperature that is represented by the target impedance.

Figure 6:
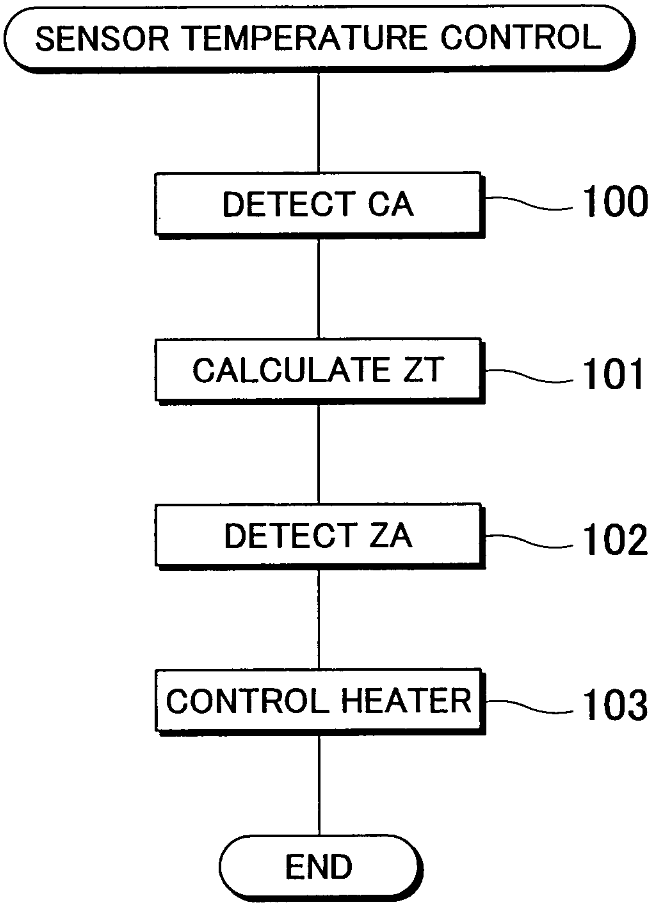
FIG. 6 is a flowchart for executing a sensor temperature control routine.

FIG. 6 shows a sensor temperature control routine of this embodiment. This routine is executed by an interrupt at every set time that is determined beforehand.

Referring to FIG. 6, firstly in step 100, the alcohol concentration CA in fuel is detected by the alcohol concentration sensor 23. Subsequently in step 101, a target impedance ZT is derived from the map shown in FIG. 5. Subsequently in step 102, the actual impedance ZA is calculated. Concretely, the voltage and the current of the sensor element 28*a* are detected, and the actual impedance ZA is calculated from the current and the voltage. Subsequently in step 103, the output of the electric heater 28*b* is controlled so that the actual impedance ZA becomes equal to the target impedance ZT.

In the foregoing embodiment, the fuel property is detected by the fuel property sensor. However, various other methods for detecting the fuel property are also conceivable. For example, the fuel property can be detected on the basis of the deviation of the center of oscillation of the air-fuel ratio that occurs when an air-fuel ratio feedback correction is performed. Besides, it is also permissible to detect the fuel property only once immediately after refueling is performed, and omit the detection of the fuel property until the next time refueling is performed.

In the illustrated embodiment, the controllers are implemented with general purpose processors. It will be appreciated by those skilled in the art that the controllers can be implemented using a single special purpose integrated circuit (e.g., ASIC) having a main or central processor section for overall, system-level control, and separate sections dedicated to performing various different specific computations, functions and other processes under control of the central processor section. The controllers can be a plurality of separate dedicated or programmable integrated or other electronic circuits or devices (e.g., hardwired electronic or logic circuits such as discrete element circuits, or programmable logic devices such as PLDs, PLAs, PALs or the like). The controllers can be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controllers. A distributed processing architecture can be used for maximum data/signal processing capability and speed.

The invention claimed is:

1. A heater control device for a heater-equipped exhaust gas sensor disposed in an exhaust passageway of an internal combustion engine, comprising:

detection means for detecting a concentration of alcohol in a fuel including the alcohol used in the internal combustion engine;

setting means for setting a target impedance of a sensor element of the exhaust gas sensor based on the detected concentration of the alcohol; and control means for controlling a heater output of the exhaust gas sensor so that an impedance of the sensor element of the exhaust gas sensor becomes equal to the set target impedance, whereby a temperature of the sensor element represented by the impedance of the sensor element becomes equal to a target temperature that is represented by the target impedance.

2. The heater control device according to claim 1, wherein the detection means is provided in a fuel tank.

3. The heater control device according to claim 1, wherein the detection means is an alcohol concentration sensor.

4. The heater control device according to claim 1, wherein the control means controls the temperature of the heater by controlling the heater output.

5. A heater control method for a heater-equipped exhaust gas sensor disposed in an exhaust passageway of an internal combustion engine, comprising:

detecting a concentration of alcohol in a fuel including the alcohol used in the internal combustion engine;

setting a target impedance of a sensor element of the exhaust gas sensor based on the detected concentration of the alcohol; and controlling a heater output of the exhaust gas sensor so that an impedance of the sensor element of the exhaust gas sensor becomes equal to the set target impedance.

6. A heater control device for a heater-equipped exhaust gas sensor disposed in an exhaust passageway of an internal combustion engine, comprising:

a detection device that detects a concentration of alcohol in a fuel including the alcohol used in the internal combustion engine;

a setting device that sets a target impedance based on the detected concentration of the alcohol; and a controller that controls a heater output of the exhaust gas sensor so that an impedance of a sensor element of the exhaust gas sensor becomes equal to the set target impedance, whereby a temperature of the sensor element represented by the impedance of the sensor element becomes equal to a target temperature that is represented by the target impedance.

7. The heater control device according to claim 6, wherein the detection device is provided in a fuel tank.

8. The heater control device according to claim 6, wherein the detection device is an alcohol concentration sensor.

9. The heater control device according to claim 6, wherein the controller controls the temperature of the heater by controlling the heater output.

10. The heater control device according to claim 1, wherein the target impedance is raised in accordance with an increase to the concentration of the alcohol.

11. The heater control method according to claim 5, wherein the setting the target impedance includes raising the target impedance in accordance with an increase to the concentration of the alcohol.

12. The heater control device according to claim 6, wherein the target impedance is raised in accordance with an increase to the concentration of the alcohol.

* * * * *